United States Patent [19]

Scherbatskoy

[11] 4,416,000
[45] Nov. 15, 1983

[54] SYSTEM FOR EMPLOYING HIGH TEMPERATURE BATTERIES FOR MAKING MEASUREMENTS IN A BOREHOLE

[76] Inventor: Serge A. Scherbatskoy, Tulsa, Okla.

[21] Appl. No.: 367,265

[22] Filed: Apr. 12, 1982

Related U.S. Application Data

[60] Division of Ser. No. 121,804, Feb. 15, 1980, abandoned, which is a continuation of Ser. No. 857,677, Dec. 5, 1977, abandoned.

[51] Int. Cl.$^3$ .............................................. G01V 1/40
[52] U.S. Cl. ........................................ 367/81; 367/83; 429/112
[58] Field of Search ..................... 367/83-85, 367/81; 340/856; 181/102; 33/362, 307; 429/112, 120

[56] References Cited

U.S. PATENT DOCUMENTS

| | | | |
|---|---|---|---|
| 2,607,221 | 8/1952 | Babsar et al. | 340/856 |
| 2,654,960 | 10/1953 | Hewitt | 367/81 |
| 3,209,323 | 9/1965 | Grossman | 340/856 |
| 3,425,872 | 2/1969 | Levy | 429/112 |
| 3,831,138 | 8/1974 | Rammner | 367/81 |

FOREIGN PATENT DOCUMENTS

| | | | |
|---|---|---|---|
| 1212606 | 5/1964 | Fed. Rep. of Germany | 429/112 |
| 1910039 | 11/1976 | Fed. Rep. of Germany | 429/112 |
| 1977901 | 1/1979 | United Kingdom | 429/120 |

OTHER PUBLICATIONS

Krieeger et al., "Fusible . . . Power Supplies", 5/72, pp. 1–4, 25th Ann. Proc. Power Sources Conf.
Shimatake et al., "Development of Uncharged Li--Al/Fe Sx Cells," 9/17/76, Conf. 11th Int. Energy Conv. E.
Patton et al., "Development . . . Velocity System," 10/77, pp. 1215–1221, Jour. of Pet. Tech.
Belanger et al., "Molten Salt . . . Cell Development," 9/14/79, pp. 211–222, Conf. MAB of NATO, France.

*Primary Examiner*—Nelson Moskowitz
*Attorney, Agent, or Firm*—Head, Johnson & Stevenson

[57] ABSTRACT

A DC power source for use in a wide range of variable temperatures employing a battery having the characteristic that it is substantially dormant at normal ambient temperatures and operable only at temperatures substantially above normal ambient temperatures, including a heat retaining housing in which the battery is positioned and a controllable heat source within the housing to maintain the temperature of the battery within a preselected elevated range corresponding to the effective operating temperature characteristics of the battery.

15 Claims, 2 Drawing Figures

SYSTEM FOR EMPLOYING HIGH TEMPERATURE BATTERIES FOR MAKING MEASUREMENTS IN A BOREHOLE

CROSS-REFERENCE TO RELATED APPLICATIONS

This is a divisional application of copending application Ser. No. 121,804 entitled: "Systems, Apparatus and Methods for Logging While Drilling", filed Feb. 15, 1980 now abandoned which is a continuation of Application No. 857,677 filed Dec. 5, 1977 now abandoned.

BACKGROUND OF THE INVENTION

Many efforts have been made to develop successful logging while drilling systems, as suggested by the following examples: Karcher, U.S. Pat. No. 2,096,279 proposes a system utilizing electrical conductors inside the drill pipe. Heilhecker, U.S. Pat. No. 3,825,078 proposes a system utilizing extendable loops of wire inside the drill pipe. Silverman, U.S. Pat. No. 2,354,887 proposes a system utilizing inductive coupling of a coil or coils with the drill pipe near the drill bit with measurement of the induced electrical potential at the earth's surface. Arps, U.S. Pat. No. 2,787,759 and Claycomb, U.S. Pat. No. 3,488,629 propose systems in which pulsed restrictions to the drilling mud flow produce pressure pulse signals at the earth's surface. Other related U.S. patents are U.S. Pat. Nos. 3,186,222; 3,315,224; 3,408,561; 3,732,728; 3,737,845; 3,949,354; and 4,001,774. All of the foregoing patents are specifically incorporated into this specification by reference.

Each of the above-mentioned proposals has had some drawback of sufficient consequence to prevents its commercial acceptance. For example, the inconvenience and time involved for the large number of connections and disconnections of electrical connectors is a significant drawback in systems such as proposed by Karcher. Though an induced electric potential system such as proposed by Silverman may be considered operable for a short distance, the signal-to-noise ratio of such a system prohibits its use as a practical matter in deep wells.

When modern jet bit drilling became commonplace and very large mud volumes and high mud pressures were employed, the systems as proposed by Arps proved to be unreliable and subject to rapid deterioration. The introduction of a controlled restriction into the very powerful mud stream, of necessity, required large and powerful apparatus, and operation was unsatisfactory because of rapid wear and very high energy requirements.

The environment is very hostile at the bottom of a well during drilling. Drill bit and drill collar vibrations may be in the order of 50 g. The temperature is frequently as much as 400° F. The bottom hole pressure can be more than 15,000 psi. The drilling fluid flowing through the drill collars and drill bit is highly abrasive. With present drilling equipment including improved drill bits, the continued drilling time with a particular bit can be in the order of 100-300 hours and sometimes longer before it becomes necessary to change the drill bit. Accordingly, a downhole formation condition sensing and signal transmitting unit mounted near the drill bit must be capable of operating unattended for long periods of time without adjustment and with a continuing source of electrical power. Also, the signal communication apparatus must be capable of transmitting a continuing usable signal or signals to the earth's surface after each additional joint of drill pipe is conventionally added to the drilling string as the drilled borehole is increased in depth.

In general, systems using mud pulsations for telemetry are considered the most practical since the drilling operation is least disturbed. To date, however, the reliability that has been achieved with such systems is not satisfactory. The previous methods, such as those of Arps and Claycomb, utilize the insertion of a controlled restriction into the mud flow circuit. However, when the mud flow surpasses 600 gpm and pump pressures pass 3000 psi, controlling this large energy by varying a restriction to produce telemetry signals is complicated and requires powerful downhole machinery.

A general objective of the present invention is to provide a successful logging while drilling system of the type utilizing mud pulsations for telemetry to transmit signals representing one or more downhole parameters to the earth's surface.

Another object of the invention is the utilization of an existing large source of energy for the production of the mud pulsations.

SUMMARY OF THE INVENTION

The invention provides an apparatus for making measurements in an earth borehole such as during drilling of the borehole in which the apparatus is provided with an improved power source. The power source is comprised of a temperature resisting or insulating housing in which one or more batteries are positioned, the batteries being of the characteristic that they are substantially dormant or non-effective to produce significant current flows at normal ambient temperatures but are effective at temperature ranges substantially above normal ambient temperatures. Positioned within the insulated housing is a heat source and a control means for maintaining the temperature within a housing, and thereby the temperature of the batteries, within a preselected elevated range. By means of a conductor or conductors extending from the battery to the exterior of the housing, electrical energy is available even under conditions wherein the batteries would not normally produce electrical energy due to low ambient temperature.

The power source is useable for other purposes but is particularly useable in apparatus for making measurements in an earth borehole since at deep depths the ambient temperature is substantially above the ambient temperature at the earth's surface. By the use of the present invention, the temperature of the batteries employed in the power source can be maintained at all times in a temperature range so as to provide a readily available electrical energy source both at the earth's surface, at intermediate depths, and at lower depths within the borehole.

DETAILED DESCRIPTION

Figure 1:
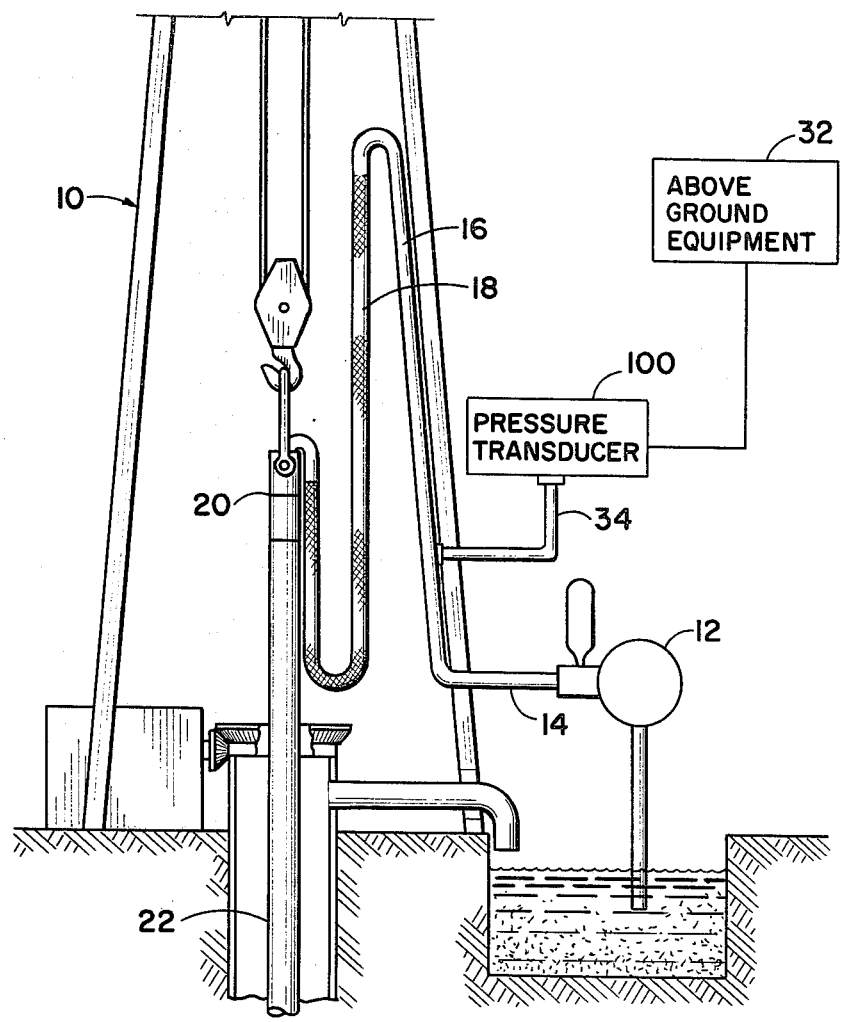
FIG. 1 is a schematic illustration of a conventional rotary drilling rig showing apparatus of the present invention incorporated therein.

Referring now to FIG. 1, there is schematically illustrated a typical drilling rig 10 including a mud circulating pump 12 connected to a discharge pipe 14, a standpipe 16, a high pressure flexible rotary hose 18, a swivel 20 and a drilling string 22, comprising the usual drill pipe and drill collars, and a jet type bit 26. A short distance above the bit 26 and mounted within drill collar 24 is a negative mud pressure pulse generator 28 and a sensing and instrumentation unit 30.

The negative mud pressure pulse generator 28 is of a special design. It generates a series of programmed pulses, and each pulse consists of a short momentary reduction in mud pressure. In one embodiment this is accomplished by means including a valve that momentarily opens a passageway between the inside and the outside of the drill collar 24, i.e., the valve controls a passageway between the inside of the drill collar 24 and the annulus 29 formed by the outside of the drill collar and the well bore.

Above-ground equipment, generally designated as 32, is connected to a pressure transducer 100, which in turn is connected to standpipe 16. Alternatively, the transducer 100 could be connected into the stationary portion of swivel 20, if desired.

Figure 2:
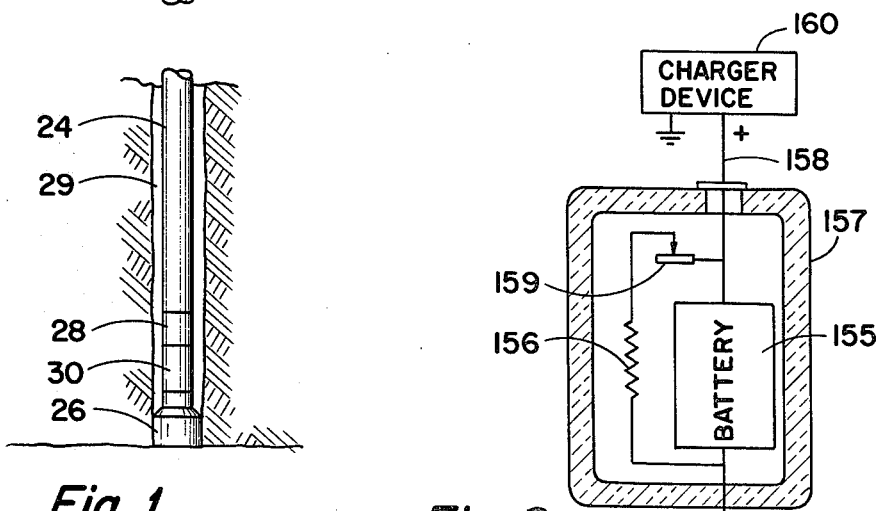
FIG. 2 is a schematic illustration of one type of self-contained downhole power source that may be utilized.

In FIG. 2 there is schematically illustrated a special type of battery that is well adapted to powering the downhole equipment of the present invention.

Deep oil wells frequently have high bottom hole temperatures 300°–400° F., and many electric batteries cannot operate at this temperature. There is, however, an exception—the modern molten salt batteries. They operate well at high temperatures of 400°–500° C. or even higher but will not operate properly at lower temperatures principally because the electrolyte solidifies and ceases to conduct electrically. A lithium aluminum iron sulphide molten salt battery is manufactured by the Eagle Pitcher Co., Joplin, Mo. Other manufacturers also manufacture high energy molten salt batteries that are especially intended for electric vehicle use. These batteries are very well adapted for high temperature operation.

As illustrated in FIG. 2, I provide an arrangement that will "start up" the battery before it is immersed into the hot environment of the oil well and will maintain it charged when in use. In FIG. 2, reference numeral 155 designates the battery proper; reference numeral 156 designates heating elements that are arranged to provide a small amount of heating to the battery 155; and reference numeral 157 designates a jacket containing thermal insulation, as for example, a material known as a "Super Insulation" manufactured by the Union Carbide Co., New York, N.Y. or "Multifoil" manufactured by The Thermo Electron Co., Waltham, Mass. Initially an external voltage (not shown) is applied to the terminal 158 (while an instrument is at the surface and before immersion into the well). This voltage activates the heating elements 156 and the battery electrolyte melts. Furthermore, the battery 155 is charged by the voltage applied at 158 before the instrument is immersed in the oil well. When the battery 155 is in its normal operating temperature range, the circuit to the heating element 156 is opened by the thermostatic switch 159 which closes during periods when additional heat to the battery 155 is required. When logging while drilling, the vibration of the tool will cause the device 160 to generate a charging current. The device 160 is described in U.S. Pat. No. 3,970,877, Russell et al. Instead of the Russeell et al device, a small mud flow powered turbine and electric generator could be used to maintain the battery charged, since only about 1 watt of continuous charging power is required.

The foregoing disclosure and the showings made in the drawings are merely illustrative of the principles of this invention and are not to be interpreted in a limiting sense.

What is claimed is:

1. A system for making measurements in an earth borehole having an improved power source, comprising:
    downhole apparatus including means for sensing the magnitudes of one or more downhole parameters and generating signals representing the magnitudes of such parameters;
    equipment at the earth's surface for detecting said signals and translating said detected signals into indications representative of the magnitudes of said downhole parameters;
    a battery within said downhole apparatus of a type that is operable only at temperatures substantially higher than those encountered in above-ground ambient air;
    a heat source for maintaining the temperature of said battery within its operable range; and
    a thermostat responsive to the battery temperature, said heat source and thermostat being connected to said battery whereby voltage supplied by said battery at least in part provides heat necessary to maintain said battery at operating temperatures during low ambient temperature conditions, said thermostat operating to remove battery voltage from said heat source when the ambient temperature is above a level which maintains said battery within its operable temperature range.

2. A power source according to claim 1 including:
    an electric generator with said downhole apparatus for minimizing the discharge of said battery.

3. A power source according to claim 1 including:
    an insulated container in which said battery and said heat source are enclosed.

4. A power source according to claim 1 wherein said battery is a molten salt battery.

5. A power source according to claim 1 wherein said battery is a lithium aluminum iron sulphide molten salt battery.

6. A power source according to claim 2 wherein said generator means includes a vibration powered generator.

7. A power source according to claim 2 wherein said generator means includes a mud flow powered turbine generator.

8. With an apparatus for making measurements in an earth borehole in which the apparatus is powered by a temperature sensitive battery having the characteristic of providing sufficient electrical potential at temperatures experienced in relatively deep locations in a borehole and providing insufficient electrical potential at temperatures experienced at ambient surface and shallow depth locations, the apparatus having a heating means associated with said battery, a method of operating such battery powered apparatus comprising the steps of:
    applying an external voltage potential to a heating means associated with a battery at the earth's surface to heat the battery to an operating temperature preparatory to lowering the measurement apparatus into the borehole;
    applying voltage from the battery to the associated heating means to heat the battery while in the borehole to maintain the temperature of the battery to an appropriate operating temperature; and removing battery voltage potential from heating application when the ambient temperature, such as that occasioned by increased borehole depth, is sufficient to maintain the battery at adequate voltage producing potential.

9. The method of claim 8 in which said apparatus for making measurements in an earth borehole includes a thermostatically controlled heating means in parallel with the battery, and in which said step of removing battery voltage potential from heating application when the ambient temperature is sufficient to maintain the battery at operating temperature includes operation of said thermostat to an opened condition.

10. The method of claim 8 including maintaining said battery and associated heating means in an insulated container.

11. The method of claim 8 wherein said battery is of the molten salt type.

12. The method of claim 8 wherein said battery is of the lithium aluminum iron sulphide molten salt type.

13. The method of claim 8 including the steps of operating a voltage generating source within a borehole and applying voltage therefrom to minimize the discharge of said battery.

14. The method of claim 13 in which the voltage generating source is a vibration powered generator.

15. The method of claim 13 in which the voltage generating source is a mud flow powered turbine generator.

* * * * *